No. 668,546. Patented Feb. 19, 1901.
J. H. SUTHERLAND.
BICYCLE FRAME MEMBER.
(Application filed Sept. 7, 1900.)
(No Model.)
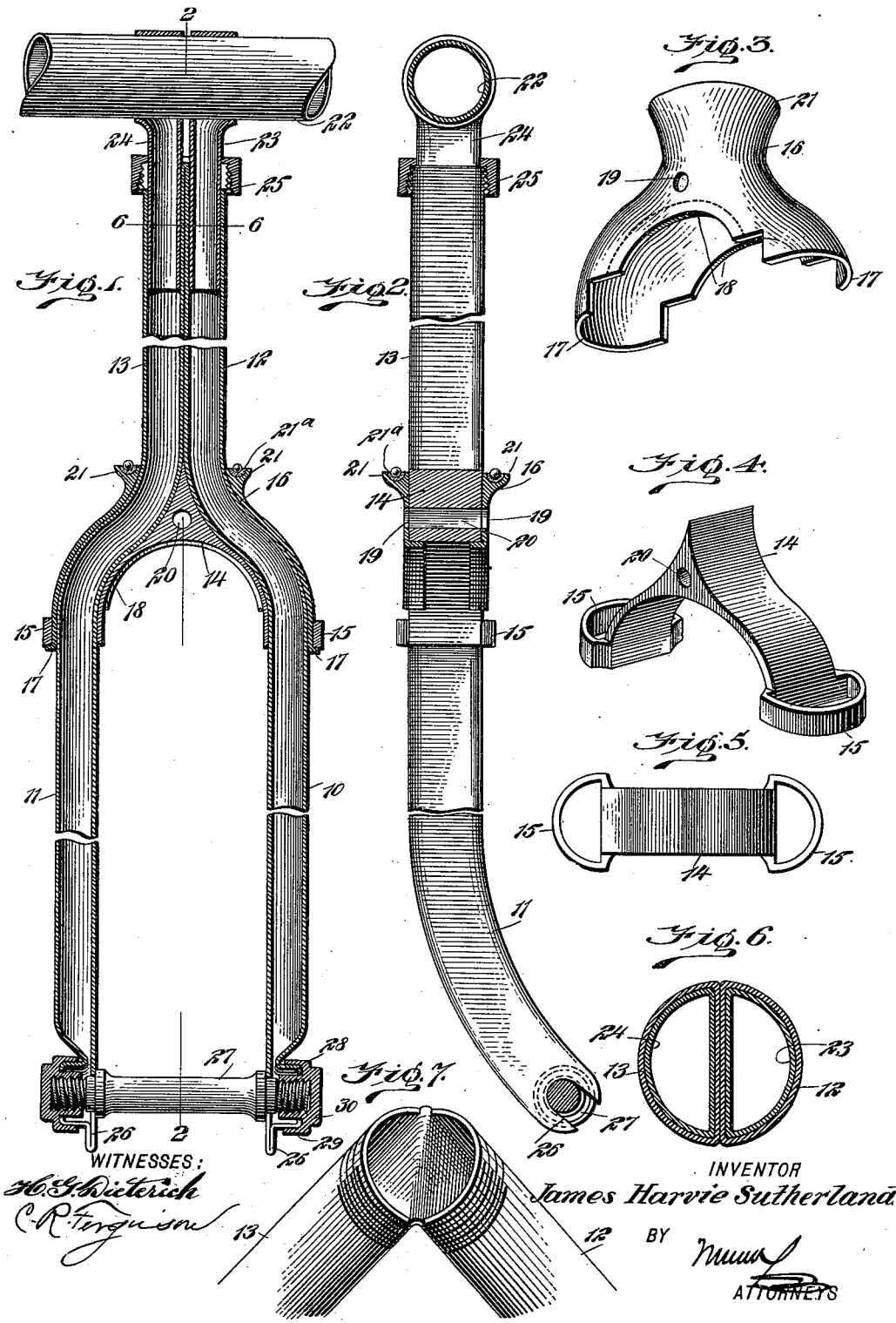
WITNESSES:
INVENTOR
James Harvie Sutherland
BY
ATTORNEYS

UNITED STATES PATENT OFFICE.

JAMES HARVIE SUTHERLAND, OF CAIRO, EGYPT, ASSIGNOR TO JAMES HARVIE SUTHERLAND, OF SAME PLACE, AND THOMAS CHARLES BRICKMAN, OF LONDON, ENGLAND.

BICYCLE FRAME MEMBER.

SPECIFICATION forming part of Letters Patent No. 668,546, dated February 19, 1901.

Application filed September 7, 1900. Serial No. 29,283. (No model.)

*To all whom it may concern:*

Be it known that I, JAMES HARVIE SUTHERLAND, a subject of the Queen of Great Britain, and a resident of Cairo, Egypt, have invented a new and Improved Bicycle Frame Member, of which the following is a full, clear, and exact description.

This invention relates particularly to improvements in forks for bicycles or the like; and an object is to provide a frame member or fork of this character that shall be light yet strong and that may be readily put together, and, further, to provide a novel means for attaching and detaching the wheel.

I will describe a bicycle frame member embodying my invention and then point out the novel features in the appended claims.

Reference is to be had to the accompanying drawings, forming a part of this specification, in which similar characters of reference indicate corresponding parts in all the figures.

Figure 1 is a sectional elevation of a frame member embodying my invention. Fig. 2 is a section on the line 2 2 of Fig. 1. Fig. 3 is a perspective view of a clamping-sleeve employed. Fig. 4 is a perspective view of a clamping-crown employed. Fig. 5 is a top view thereof. Fig. 6 is a section on the line 6 6 of Fig. 1, and Fig. 7 is a detail showing the manner of turning the tube to form the device.

The fork comprises the tubular side members 10 and 11, which extend from the head portions 12 and 13. The portions 10 and 11 may be made cylindrical, oval, or as desired. The portions 12 and 13, however, which are tubular, are made semicylindrical, with their flat surfaces engaging one with the other, as clearly indicated in Figs. 1 and 6, making the head cylindrical or round when the two parts are secured together. It will be noted that the parts 10, 11, 12, and 13 are made of a single length of tubing bent together at the top. Arranged between the fork members at their junction with the head portions 12 and 13 is a clamping-crown 14, which at its lower ends has collars 15 for engaging around the members 10 and 11 of the fork. Engaging with the head members 12 and 13 and with the upper portions of the members 10 and 11 is a clamping-sleeve 16, which has portions 17 engaged in the collars 15, and the lower edges of these portions 17 are turned outward underneath the collars, as clearly shown in Fig. 1. The opposite edges 18 of the clamping-sleeve are designed to be crimped or turned underneath the clamping-crown, as shown in the drawings, and it is obvious that by this construction there can be no possible slipping of the parts relatively to each other or a slipping of said parts on the fork members. As a further means for securing the clamping devices together, however, the sleeve 16 may be provided with holes 19 in its opposite walls and the crown 14 with a hole 20, adapted to register with the holes 19, and through these holes a bolt or cotter may be passed. When the bolt is employed, it may be utilized at the front for fastening a lamp-plate and at the back the mud-guard. The upper portion of the sleeve 16 is flared outward, as at 21, to receive a hardened-steel raceway $21^a$ for bearing-balls. The other portion of the raceway, it is to be understood, will be formed in the head of the frame that engages around the portions 12 and 13.

The post for the handle-bars 22 consists of two semicylindrical sections 23 and 24, which telescope into the sections 12 and 13. By this construction there can be no possible turning of the post relatively to the fork, and as a means for clamping the post the upper ends of the sections 12 and 13 may be slitted or kerfed and a clamping-nut 25 engaged with an exterior thread on the upper end of said portions 12 and 13.

At the lower end the fork members 10 and 11 have downwardly and outwardly opening slots 26, in which the hub portions of the wheel-spindle 27 engage. The walls of the slots are turned outward to form flanges 28, which pass into tapered recesses 29, formed in crown-nuts 30, the said crown-nuts engaging with the threaded extended ends of the spindle 27. By this construction it is obvious that the wheel may be readily removed without springing the members of the fork apart, as is sometimes done. It is only necessary to remove the nuts 30, so that the spindle may be passed out of the slots.

By the method of fastening the members of the device as described it is obvious that no brazing or soldering is necessary, and further, the frame member may be easily and quickly constructed.

Having thus described my invention, I claim as new and desire to secure by Letters Patent—

1. A bicycle-fork, comprising the tubular lower members and the tubular upper members, the said upper members being semicylindrical, a clamping crown or block engaged with the members at the lower side and having collars at its ends for engaging around the lower members of the fork, and a sleeve engaging with the members at the bend and having portions extended through the said collars and then turned outward, substantially as specified.

2. A bicycle-fork, having outwardly-opening slots at the lower end of its members, the walls of said slots being flanged outward, a wheel-spindle for engaging in said slots, and nuts for engaging the threaded ends of said spindle and having recesses to receive the said flanged walls, substantially as specified.

In testimony whereof I have signed my name to this specification in the presence of two subscribing witnesses.

JAMES HARVIE SUTHERLAND.

Witnesses:
JONATHAN SHIMMIN,
SCHASSEAUD.